Oct. 11, 1955 F. B. BERGER ET AL 2,720,646
SWEEP SYSTEM FOR CATHODE RAY TUBE
Filed Nov. 13, 1945 3 Sheets-Sheet 1
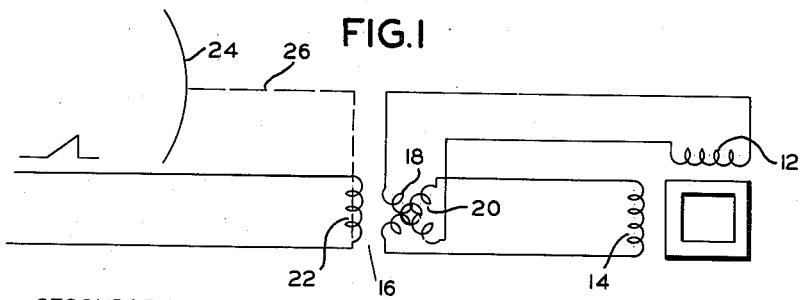
FIG.1
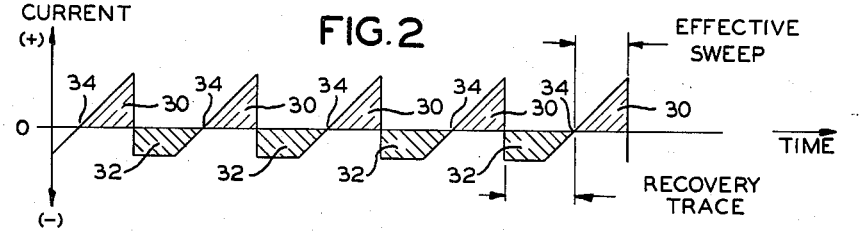
FIG.2
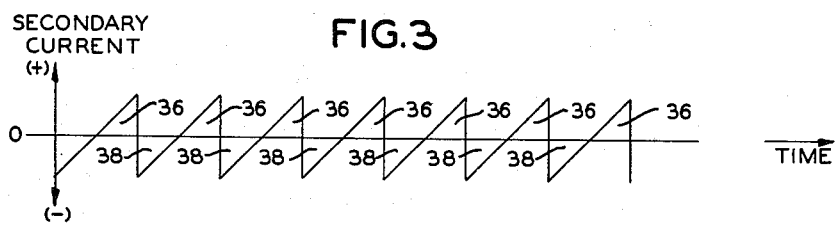
FIG.3
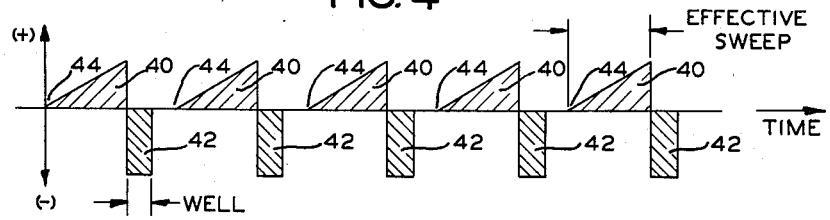
FIG.4
FIG.5
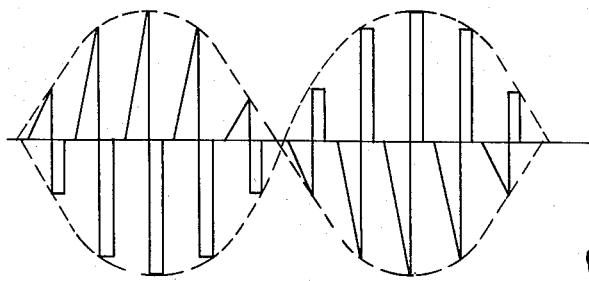
INVENTORS
FRANCE B. BERGER
PAUL JARMOTZ
LELAND J. HAWORTH
BY
Ralph L Chappell
ATTORNEY Oct. 11, 1955  F. B. BERGER ET AL  2,720,646
SWEEP SYSTEM FOR CATHODE RAY TUBE
Filed Nov. 13, 1945  3 Sheets-Sheet 2
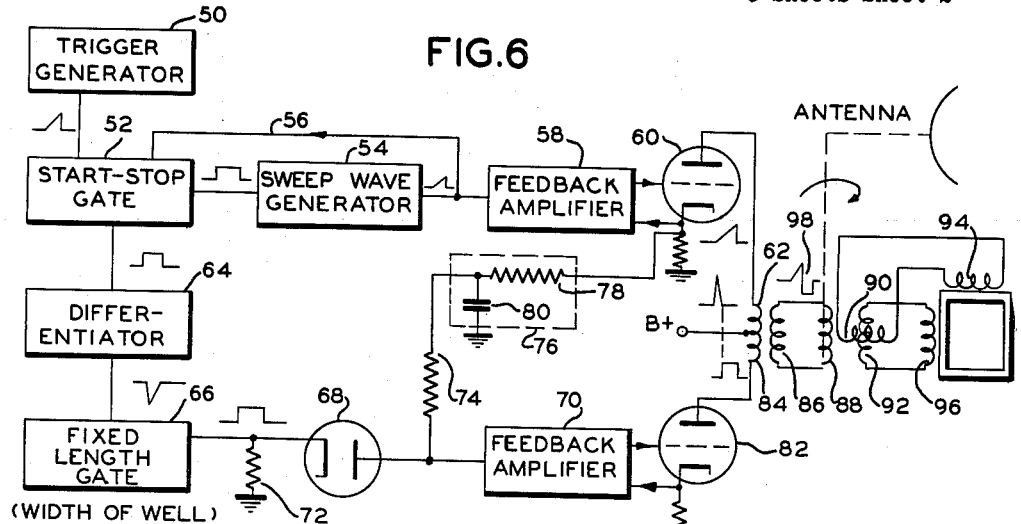
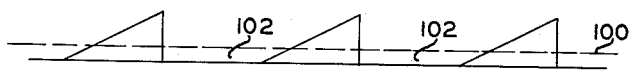
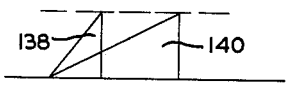
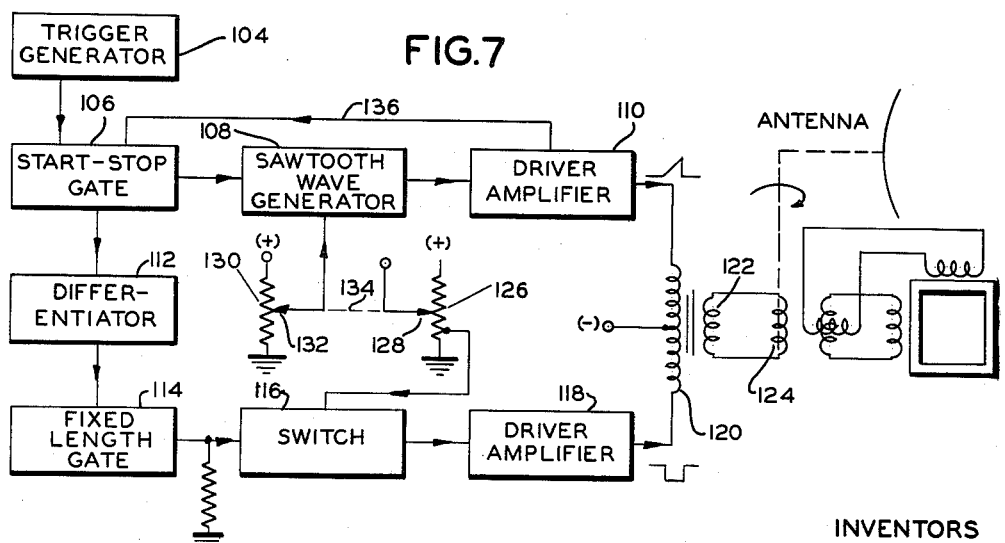
INVENTORS
FRANCE B. BERGER
PAUL JARMOTZ
LELAND J. HAWORTH
BY
ATTORNEY Oct. 11, 1955     F. B. BERGER ET AL     2,720,646
SWEEP SYSTEM FOR CATHODE RAY TUBE
Filed Nov. 13, 1945     3 Sheets-Sheet 3

INVENTORS
FRANCE B. BERGER
PAUL JARMOTZ
LELAND J. HAWORTH
BY
ATTORNEY 2,720,646

SWEEP SYSTEM FOR CATHODE RAY TUBE

France B. Berger, Watertown, Paul Jarmotz, Boston, and Leland J. Haworth, Belmont, Mass., assignors, by mesne assignments, to the United States of America as represented by the Secretary of the Navy Application November 13, 1945, Serial No. 628,282

14 Claims. (Cl. 343—11)

This invention relates to sweep wave generators, and more particularly to such generators used for radar systems of the plan position indicator type having fixed deflection coils.

The primary object of the present invention is to generally improve sweep wave generators of the specified character. By keeping the start of the sweep wave on the axis, the radial sweeps of the electron beam in the cathode ray tube will start at a common origin on the screen. Usually this requires a large number of clamping tubes and driver tubes, which must be located at or near the cathode ray tube. This is inconvenient when a remote indicator is wanted, or in airborne apparatus in which the so-called "indicator package" is desirably kept small.

One object of the present invention is to make it possible to keep the indicator package small, and to dispense with the use of clamping and driver tubes located at the cathode ray tube.

When separate drivers are used for the different deflection coils, it is difficult to obtain equal gain throughout the range for the different drivers. To do so requires expensive construction, or if a simpler construction is employed, the picture on the screen loses precision and fidelity. Range markers which ideally should trace out circles on the screen will, due to the distortions mentioned, trace out ellipses or a "circle" flattened on four sides. A further object of the present invention is to overcome the foregoing difficulty.

The above objects are fulfilled by a transformer feed system, in which only a single sweep wave is generated and amplified. This wave is resolved into sine and cosine components by means of a multi-phase variable transformer, the outputs of which are supplied to the fixed deflection coils of the cathode ray tube.

However, in going through a transformer the sweep wave must necessarily become an alternating current with half its area located on each side of the zero axis. This leads to a number of difficulties, one of which is that a change in range scale or sweep speed will cause the current to pass through zero at a different point in the cycle. Inasmuch as an adjustable range scale or sweep speed is usually wanted in radar apparatus, the change in "pivot point" complicates the task of synchronizing the range trace of the cathode ray tube beam with the range from which echoes are being received. A change in location of the pivot point of the sweep wave will also be caused by a change in duty cycle. Moreover, the maximum duty cycle obtainable is approximately 50%.

Further objects of the present invention are to overcome the foregoing difficulties, and to provide a sweep wave which will be balanced above and below the zero axis, and yet have a fixed pivot point, or more specifically, a sweep wave in which the zero axis passes through the start of the sloping parts of the wave. This is done by providing a negative excursion which is generally rectangular in shape, and of narrow width but substantial depth. For convenience, this deep narrow negative excusion may be called a "well."

To accomplish the foregoing general objects, and other more specific objects which will hereafter appear, our invention resides in the method and circuit elements, and their relation one to the other, as are hereinafter more particularly described in the following specification. The specification is accompanied by drawings in which:

Fig. 1 is a diagram explanatory of the invention;

Figs. 2 and 3 show faults overcome by the present invention;

Fig. 4 illustrates the wave form used in the present invention;

Fig. 5 shows the sine or cosine modulation of the sweep wave;

Fig. 6 is a schematic diagram of one form of the invention, in which the area of the well is automatically adjusted electrically to equal the area of the sweep wave;

Fig. 6A is explanatory of the circuit shown in Fig. 6;

Fig. 7 shows a modified form of the invention in which the area of the well is varied by mechanical connection to the range varying means;

Fig. 7A is explanatory of the circuit of Fig. 7; and

Figure 8:
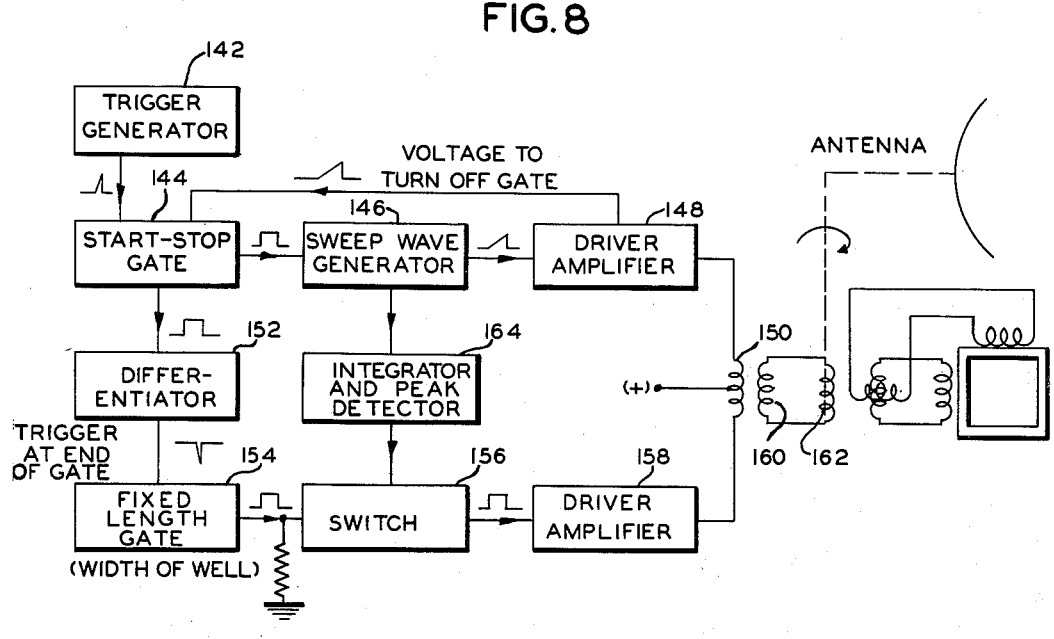
Fig. 8 illustrates still another form of the invention.

Referring to the drawing, and more particularly to Fig. 1, the fixed deflection coils 12 and 14 of the cathode ray tube may be energized remotely, say 50 to 100 feet from the main apparatus, by feeding the same through a rotary transformer 16. This has stator coils 18 and 20 connected to the deflection coils 12 and 14 respectively, and a rotor coil 22 which is rotated in unison with the antenna or scanning system 24, as by means of a mechanical connection or a synchronous system, schematically indicated by the broken line 26. A single sweep wave is generated, this being supplied to the primary 22 of the rotary transformer 16. This is resolved into sine and cosine components, to produce the desired rotating sweep.

This arrangement has the advantage of providing a small indicator package which may be located remotely from the main apparatus. It also has the advantage of accuracy, because there is no need to match multiple drivers. It is also economical of power consumption. However, it has a disadvantage in that the sweep wave, after going through a transformer coupling, is necessarily an alternating current balanced on opposite sides of a zero axis, as is shown in Fig. 2. In this figure, the triangular portions 30 represent the sweep portions of the wave while the trapezoidal portions 32 serve merely to balance the area of the sweep portions 30. The portions 32 would cause a recovery excursion of the beam, but may be made invisible by blanking out the beam.

Difficulty arises because of changes in the location of the cross over point 34 where the sloping portion of the sweep wave crosses the zero axis. This so-called "pivot-point" corresponds to the origin from which the radial sweeps start. A change in range scale is produced by changing the sweep speed or the slope of the wave, and this shifts the location of the pivot point 34. Also, a change in duty cycle will shift the location of the pivot point. Moreover, the maximum duty cycle obtainable is that corresponding to the sweep wave shown in Fig. 3, in which there is no dwell period between successive sweeps, and yet in which the duty cycle is only 50%, because the positive useful sweep area 36 is balanced by the negative area 38.

To overcome the foregoing difficulties, our invention provides a sweep wave of the character shown in Fig. 4, in which the positive sweep portions 40 are balanced by narrow deep rectangular portions or "wells" 42. Because the width of these wells is less than the dwell period between successive sweeps, the duty cycle may be changed without changing the location of the pivot point 44. Moreover, the range scale or slope of the sweep portions 40 may be changed without shifting the location of the pivot point 44.

The wave form shown in Fig. 4 is that supplied to the primary of the rotary transformer. The output of the rotary transformer is modulated, as suggested in Fig. 5, there being two such waves with envelopes displaced 90° in phase.

It will be understood that the area of the well 42 (Fig. 4) is equal to the area of the sweep wave 40. In a simple form of apparatus this may be done by using circuits of fixed constants. In such case the circuits are adjusted and left in that condition. However, in many cases it is desirable to provide variations in the sweep wave. One common variation is in the range scale. To change the range scale the slope of the sweep wave is changed, and inasmuch as this will change the area of the triangle for a constant height (corresponding to a constant radius on the cathode ray tube screen), it is necessary to commensurately change the area of the well. In some cases it may be desired to vary the repetition rate. In other cases, it may be desired to depart from a linear sweep, as for example, when using a hyperbolic sweep for ground range in airborne equipment.

Some typical circuits illustrating the application of the invention to these varied requirements are described hereinafter.

Referring first to Fig. 6, this illustrates a form of the invention in which the sweep wave may be of any desired shape or, in other words, need not be linear or triangular. However, in this form of the invention a constant repetition rate is presumed.

The trigger generator 50 triggers a gate generator 52, which gates a sweep wave generated in a sweep wave generator 54. There is a feed back connection 56 from the sweep wave generator 54 to the gate generator 52, in order to cut off the gate as soon as the sweep wave reaches a constant height. This gate may be called a "start-stop gate." The resulting sweep wave is amplified in a feedback amplifier 58, and is supplied through a final driver 60 to the upper end 62 of a transformer primary.

The trailing edge of the start-stop gate is differentiated in a differentiator 64 thus providing a trigger for triggering a second gate generator 66 which provides a short gate of fixed length, corresponding to the desired width of the well. The gate from generator 66 is supplied to the cathode of a diode 68 acting as an electronic switch. The anode of the diode 68 is connected to the grid of the input tube (not shown) in a feed back amplifier 70. When the switch 68 is conductive, the grid of the amplifier 70 is brought to ground potential, as is indicated by the ground 72, and there is no output from the amplifier 70. However, for the duration of the fixed length gate from generator 66 the switch 68 is opened, and the input grid of amplifier 70 assumes a potential determined by the potential of conductor 74.

This potential determines the depth and consequently the area of the well, and in the present case is automatically varied to provide an area which balances the area of the sweep wave. This is done by filtering the sweep wave, thereby providing a potential proportional to the sweep wave averaged over one complete cycle. This average potential is supplied through lead 74 to the amplifier 70. In the present case the filter 76 comprises simply a resistor 78 and a capacitor 80, but it will be evident that more elaborate forms of filter may be provided if desired.

The output of amplifier 70 is amplified in a final driver tube 82, which forces a current of the desired waveform to flow through the lower half 84 of the transformer primary.

The secondary 86 is connected to the rotating primary 88 of a rotary transformer, the stators 90 and 92 of which are connected to the deflection coils 94 and 96, respectively, of the cathode ray tube. It will be understood that the number of tubes employed and the connections are such that the sweep wave and the well are oppositely poled or phased, so that when combined in the transformer primary a wave of desired shape is produced in the secondary 86, as is indicated at 98.

Although this method is independent of the periodic sweep wave shape, it requires a constant repetition frequency, for a reason which will be clear by reference to Fig. 6A, in which it will be seen that the height of the average line 100 is determined by the trapezoidal area 102 between sweeps.

Another form of the invention is shown in Fig. 7. This is generally similar to that previously described in providing a trigger generator 104, a start-stop gate generator 106, a sweep generator 108, a driver 110, a differentiator 112, a fixed length gate generator 114, an electronic switch 116, and a driver and amplifier 118, and in combining the sweep and the well in a transformer primary 120, the secondary 122 of which is connected to the rotary primary 124 of a rotary transformer. However, in the present case the voltage defining the depth of the well is determined by a voltage regulating device, more simply a linear potentiometer 126, the slider 128 of which is mechanically connected to a means for changing the range scale or slope of the sweep. Specifically, the slope of the sweep wave is determined by a linear potentiometer generally designated 130. Its slider 132 is mechanically connected to the slider 128, as for example, by using a common shaft, indicated by the broken line 134.

This arrangement is simple, but for successful operation, the sweep generator 108 must be a linear or true sawtooth generator, and the feed back connection 136 for stopping the gate 106 as soon as the sweep reaches a predetermined height is essential instead of merely desirable. The reason for this will be seen by inspection of Fig. 7A. If the triangles 138 and 140 are of equal height, the area will vary in accordance with the length of the base line. Because the slope depends on the ratio of the side opposite over the side adjacent, the area varies inversely as the slope. The voltage from potentiometer 126 is inversely proportional to the slope, and is proportional to the area of the well. Since the area of the sawtooth and the area of the well are both inversely proportional to the slope, they must be proportional to each other, and by a proper choice of circuit constants they are made equal to each other.

Fig. 8 shows still another form of our invention which will function without limitation as to the repetition frequency, or the height of the sweep wave, or the shape of the sweep wave.

As before, the apparatus includes a trigger generator 142 controlling the start-stop gate generator 144 for a sweep wave generator 146, the output of which is amplified in a driver amplifier 148, and fed to a transformer primary 150. The trailing edge of the start-stop gate is differentiated in a differentiator circuit 152 which triggers a fixed length gate generator 154, said gate determining the width of the well, and functioning to open a normally closed electronic switch 156. The resulting well is amplified in a driver amplifier 158, the output of which is connected to the transformer primary 150. As before, the secondary 160 is connected to the rotatable primary 162 of a rotary transformer which is connected to the fixed deflection coils of the cathode ray tube.

In the present case the depth of the well is determined by an integrator circuit followed by a peak detector, as is indicated at 164. When the sweep wave form is integrated overtime, a voltage is obtained, which is proportional to area. This voltage wave is peak detected, thus producing a D. C. voltage which is proportional to the area of the sweep wave form referred to the base line.

The integrator circuit may be of any conventional type, for example, one comprising a resistor in series with a capacitor, with the input supplied to one end of the resistor, and the output taken between the junction of the resistor and capacitor, and ground; a switch tube shorting the condenser except during the sweep portion of the wave form.

Our invention comprehends still another method of controlling the area of the well, which method may be called a "feed back" method. In one form, both the sawtooth and the well are each averaged in separate filter circuits, and the difference between the averages may be amplified and used to vary the depth of the well or the width (gate length) of the well in that direction which tends to reduce the difference between the averages to zero.

Still another feed back method is to sample the current in the transformer secondary at the instant of the start of the sweep wave, or in other words, at the pivot point. The voltage at this point should be zero, but if it differs from zero this difference may be amplified and used to control the width or the depth of the well in such a direction as to tend to reduce the current at the pivot point to zero.

It is believed that the method of our invention, the several described forms of apparatus of our invention, as well as the advantages thereof, will be apparent from the foregoing detailed description. It will also be apparent that while we have shown our invention in a number of preferred forms, many changes may be made in the circuits disclosed, without departing from the spirit of the invention, as sought to be defined in the appended claims.

In the claims there is reference to the deflection coils of the cathode ray tube, but it is not intended to exclude the use of an electrostatic type tube. The only difference is that a voltage wave will be applied to deflecting plates, instead of a current wave to deflecting coils.

Moreover, even with magnetic deflecting coils, some though not all, of the advantages of the invention may be obtained by using the rotary transformer to resolve a voltage wave (instead of a current wave) into sine and cosine components, and then using the voltage components to drive separate driver tubes to produce separate current waves for the deflecting coils.

In Figs. 6, 7, and 8, the width of the well is constant, and its depth varied. However, by using a gate circuit producing a gate the width of which depends on a voltage, the area control voltages described in the said figures may be used to control the width instead of the depth of the well.

We claim:

1. In radar apparatus of the plan position indicator type, a rotating scanning antenna, a cathode ray tube having fixed deflection coils, a rotary transformer of the single phase to multi-phase type having its multi-phase coils connected to the fixed deflection coils, the single phase primary being coupled to said antenna for scanning movement therewith, and means to supply said primary with an alternating sweep wave including a sloping positive sweep portion and an immediately following negative well portion having an area equal to the area of the sloping sweep portion, said means including a sweep generator, a gate wave generator triggered at the end of the sweep to determine the width of the well at a constant value less than the time interval between successive sweep portions, and means to feed the positive sweep portion and negative well portion to the transformer primary in proper phase and time sequence.

2. In radar apparatus of the plan position indicator type, a rotating scanning antenna, a cathode ray tube having fixed deflection coils, a rotary transformer of the single phase to multi-phase type having its multi-phase coils coupled to the fixed deflection coils, the single phase primary being coupled to said antenna for scanning movement therewith, and means to supply the primary with an alternating sweep wave including a sloping positive sweep portion and an immediately following negative well portion having an area equal to the area of the sloping sweep portion, said means including a sweep generator, an electronic switch, a gate wave generator triggered at the end of the sweep for controlling said electronic switch to determine the width of the well at a constant value less than the time interval between successive sweep portions, a filter energized by said positive sweep portion to derive the average voltage thereof and means responsive to said average voltage to control the depth of the well, and means to feed said positive sweep portions and negative well portion to the transformer primary in proper phase and time sequence.

3. In radar apparatus of the plan position indicator type, a rotating scanning antenna, a cathode ray tube having fixed deflection coils, a rotary transformer of the single phase to multi-phase type having its multi-phase coils connected to the fixed deflection coils, the single phase primary being coupled to said antenna for scanning movement therewith, and means to supply the primary with an alternating current sweep wave including a sloping position sweep portion and an immediately following negative well portion having an area equal to the area of the sloping sweep portion, said means including a sweep generator, a start-stop gate generator for said sweep generator, means to differentiate the trailing edge of the start-stop gate to provide a trigger, an electronic switch, a second gate wave generator triggered thereby at the end of the sweep for controlling said electronic switch to determine the width of the well at a constant value less than the time interval between successive sweep portions, and means to feed said positive sweep portions and negative well portions to the transformer primary in proper phase and time sequence.

4. Apparatus as defined in claim 2 which further includes means for integrating the output wave form of the positive sweep wave generator to derive a voltage proportional to the area of said positive sweep wave, and a peak detector connected to the output of said integrating means to derive a control voltage therefrom, the output of said peak detector being applied to determine the amplitude of the well.

5. Apparatus as defined in claim 3 which further includes means for integrating the output wave form of the positive sweep wave generator to derive a voltage proportional to the area of said positive sweep wave, and a peak detector connected to the output of said integrating means to derive a control voltage therefrom, the output of said peak detector being applied to determine the amplitude of the well.

6. Apparatus for generating an alternating current sweep wave comprising means for generating a positive sloping sweep excursion, means for generating a negative recovery excursion between sweeps, means for maintaining the amplitude of said negative excursion constant, and means responsive to said positive sweep excursion to derive a voltage proportional to the average voltage thereof for controlling the width of said negative excursions to hold the positive and negative areas of said sweep wave equal.

7. Apparatus for genertaing an alternating current sweep wave comprising means for generating a positive sloping sweep excursion, means for generating a negative recovery excursion, means for regulating the time duration of said negative excursion at a constant value, and means responsive to said positive sweep excursion to derive a voltage proportional to the rate of change of voltage thereof to control the amplitude of said negative excursion.

8. Apparatus for generating an alternating current sweep wave comprising means for generating a positive sloping sweep excursion, means for generating a negative recovery excursion, means for regulating the time duration of said negative excursion at a constant value, and means responsive to said positive sweep excursion to derive a voltage related to the area thereof to control the amplitude of said negative excursion to hold the area of said negative excursion equal to the area of said positive excursion.

9. Apparatus for generating an alternating current sweep wave comprising means for generating a positive sloping sweep excursion, means for generating a negative recovery excursion, means for regulating the time duration of said negative excursion at a constant value, a filter energized by said positive sloping sweep excursion for deriving a potential proportional to the average potential thereof, and means responsive to said derived potential for controlling the amplitude of said negative excursion to hold the positive and negative areas of said sweep wave equal.

10. Apparatus for generating an alternating current sweep wave comprising means for generating a positive sloping sweep excursion of constant amplitude, means for controlling the slope of said positive sloping sweep excursion means for generating a negative recovery excursion, means for regulating the time duration of said negative excursion at a constant value, means adjustable in accordance with said controlling means for deriving a potential inversely proportional to the slope of said positive excursion, and means responsive to said derived potential for controlling the amplitude of said negative excursion to hold the positive and negative areas of said sweep wave signal equal.

11. Apparatus for generating an alternating current sweep wave comprising means for generating a positive sloping sweep excursion, means for generating a negative recovery excursion, means for regulating the time duration of said negative excursion at a constant value, an integrator circuit responsive to said positive sloping excursion for obtaining an output proportional to the integral of said positive sloping excursion, means for deriving a potential proportional to the peak amplitude of said integral, and means responsive to said potential for controlling the amplitude of said negative excursion to hold the positive and negative areas of said sweep wave equal.

12. Apparatus for keeping the zero axis of an alternating current sweep wave at the beginning of the sloping part of the wave comprising, a saw-tooth wave generator, means responsive to the output of said generator to terminate said wave at a predetermined amplitude, means to differentiate the output of said generator to derive a control pulse at the termination of said wave, means responsive to said control pulse to generate a voltage square wave having a predetermined time duration, means to integrate the output of said generator to derive therefrom a control voltage proportional to the area of said saw-tooth wave, means to control the amplitude of said voltage square wave in response to said control voltage, and means to combine said saw-tooth wave form and said rectangular wave form in proper phase and polarity to provide an alternating sweep wave having a sloping positive sweep portion and an immediately following negative well portion of equal area.

13. Apparatus for keeping the zero axis of an alternating current sweep wave at the beginning of the sloping part of the wave comprising, a saw-tooth wave generator, means responsive to the output of said generator to terminate said wave at a predetermined amplitude, means to differentiate the output of said generator to derive a control pulse at the termination of said wave, means responsive to said control pulse to generate a voltage square wave having a predetermined time duration, means responsive to the output of said generator to derive the average voltage thereof, means to control the amplitude of said voltage square wave in response to said average voltage, and means to combine said saw-tooth wave form and said rectangular wave form in proper phase and polarity to provide an alternating sweep wave having a sloping positive sweep portion and an immediately following negative well portion of equal area.

14. In a radar apparatus of the plan position indicator type, a rotating scanning antenna, a cathode ray tube having fixed deflection coils, a rotary transformer of the single-phase to multi-phase type having its multi-phase coils connected to the fixed deflection coils, the single-phase primary being mechanically coupled to said antenna for scanning movement therewith, and means to supply the primary of said transformer with an alternating current sweep wave including a sloping positive sweep portion and an immediately following negative well portion having an area equal to the area of the sloping sweep portion, said means including a sweep generator, a start-stop gate generator for said sweep generator, means to differentiate the trailing edge of the start-stop gate to provide a trigger pulse, an electronic switch, a second gate wave generator responsive to said trigger pulse for controlling said electronic switch to determine the width of the well at a constant value less than the time interval between successive sweep portions, a filter circuit energized by said positive sweep portion to derive the average voltage thereof, and means responsive to said average voltage to control the amplitude of said well portion, and means to feed said positive sweep portions and negative well portions to said primary of said rotary transformer in proper phase and time sequence.

References Cited in the file of this patent

UNITED STATES PATENTS

| | | |
|---|---|---|
| 2,059,219 | Farnsworth et al. | Nov. 3, 1936 |
| 2,110,245 | Stocker | Mar. 8, 1938 |
| 2,144,351 | Vance | Jan. 17, 1939 |
| 2,400,791 | Tolson et al. | May 21, 1946 |
| 2,409,456 | Tolson et al. | Oct. 15, 1946 |